US008491721B2

(12) United States Patent
Ortega et al.

(10) Patent No.: US 8,491,721 B2
(45) Date of Patent: Jul. 23, 2013

(54) METHOD OF CLEANING AND DEGASSING A STORAGE VESSEL

(75) Inventors: Pilar Ortega, Rancho Palos Verdes, CA (US); William Farone, Anaheim, CA (US)

(73) Assignee: International Technologies and Services, Inc., Torrance, CA (US)

( * ) Notice: Subject to any disclaimer, the term of this patent is extended or adjusted under 35 U.S.C. 154(b) by 796 days.

(21) Appl. No.: 12/540,229

(22) Filed: Aug. 12, 2009

(65) Prior Publication Data

US 2010/0037920 A1 Feb. 18, 2010

Related U.S. Application Data

(60) Provisional application No. 61/088,989, filed on Aug. 14, 2008.

(51) Int. Cl.
   *B08B 9/08* (2006.01)
(52) U.S. Cl.
   USPC .................. 134/22.1; 134/26; 134/29; 134/40
(58) Field of Classification Search
   None
   See application file for complete search history.

(56) References Cited

U.S. PATENT DOCUMENTS

| 5,302,320 | A | * | 4/1994 | Hosmer et al. | 516/66 |
| 5,776,257 | A | * | 7/1998 | Arnold et al. | 134/11 |
| 6,069,002 | A | * | 5/2000 | Powell, Jr. | 435/264 |
| 7,840,366 | B1 | * | 11/2010 | Moses et al. | 702/85 |

OTHER PUBLICATIONS

Cassinis: Microbail Water Treatment: An Alternative Treatment to Manage Sulfate Reducing Bacteria (SRB) Activity, Corrosion, Scale, Oxygen, and Oil Carry-Over At . . . 1998.
Mysels, Karol, J: Introduction to Colloid Chemistry, 1964.
International Technologies and Services: Your Waste Is Your Responsibility FRom Cradle to Grave, booklet, Jul. 2003.
Rule 1149. Storage Tank and Pipeline Cleaning and Degassing, p. 1-6, Adopted Dec. 4, 1987, Amended Apr. 1, 1988, Jul. 14, 1995, May 2, 2008.
Preliminary Draft/Staff Report Proposed Amended Rule 1149. Storage Tank and Pipeline Cleaning and Degassing, Dec. 2007.

* cited by examiner

*Primary Examiner* — Michael Kornakov
*Assistant Examiner* — Ryan Coleman
(74) *Attorney, Agent, or Firm* — John J. Connors; Connors & Assoc pc.

(57) ABSTRACT

A sealed storage vessel containing volatile organic vapor over a bottom sludge layer is cleaned by (a) determining the level of free oil in the vessel and then using (b) either a two-stage or one-stage treatment regime, adding a cleaning agent thereto. If the free oil is greater than 2 volume percent the two-stage regime is used where an oil release agent is initially mixed with the sludge to separate the oil from solids in the sludge. The separated oil floats on the surface of water and is removed without substantially exposing the vessel's interior to the atmosphere, leaving within the vessel a mixture of water, solids, and trace amounts of hydrocarbons. Next, a predetermined amount of an emulsifying agent is added to substantially emulsify the trace hydrocarbons, so the level of volatile organic compounds remaining in the interior of the vessel is no greater than 5,000 ppmv, measured as methane, at least one hour after adding the emulsifying agent. If the free oil is less than 2 volume percent, the one-stage treatment regime is employed by only adding the emulsifying agent to achieve this same level of volatile organic compounds.

6 Claims, 1 Drawing Sheet

METHOD OF CLEANING AND DEGASSING A STORAGE VESSEL

RELATED PATENT APPLICATIONS & INCORPORATION BY REFERENCE

This is a utility application that claims the benefit under 35 USC 119(e) of U.S. Provisional Patent Application No. 61/088,989, entitled "METHOD OF CLEANING AND DEGASSING A STORAGE VESSEL," filed Aug. 14, 2008. This related application is incorporated herein by reference and made a part of this application. If any conflict arises between the disclosure of the invention in this utility application and that in the related provisional application, the disclosure in this utility application shall govern. Moreover, any and all U.S. patents, U.S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The words "consisting," "consists of," and other forms thereof, are intended to be equivalent in meaning and be closed ended in that an item or items following any one of these words is meant to be an exhaustive listing of such item or items and limited to only the listed item or items.

The word "vessel" means any container adapted to hold oil, for example, storage tanks with a fixed roof or a floating roof, pipelines, above-ground containers, and underground containers.

The words "free oil" mean oil in sludge that is above the solubility product of any of the other constituents of the sludge and which can be coalesced by a change in surface tension by a surfactant.

The words "substantially" and "essentially" have equivalent meanings.

BACKGROUND

Cleaning an oil storage vessel is a difficult task because it requires removal of a layer of sludge remaining in the bottom of the vessel after most of the oil has been drained away. Sludge comprises mainly of a mixture of solids and oil and some water usually. Sometimes as much as 5 volume percent of the vessel is filled with sludge after the vessel has been drained of essentially all the oil stored therein. Typically, in a large vessel designed to hold in excess of 7,000 barrels of oil, up to about 1-5 volume percent of the maximum volume of oil held in the vessel prior to being drained remains in the residual sludge. This sludge consequentially is a source of volatile organic compounds (VOC). Prior to opening the vessel to the atmosphere (referred to as degassing in the oil industry) these volatile organic compounds need to be reduced, because regulations governing air quality standards have imposed restrictions on the amount of VOC present in the vessel prior to degassing. For example, the State of California's South Coast Air Quality Management District has adopted Rule 1149 governing "Storage Tank and Pipeline Cleaning and Degassing." A draft staff report to the South Coast Air Quality Management District Governing Board discusses this Rule 1149. Rule 1149 requires that prior to degassing a vessel the level of volatile organic compounds remaining in the interior of the vessel be no greater than 5,000 ppmv, measured as methane, at least one hour after cleaning the vessel. Rule 1149 was adopted because using conventional cleaning techniques, although the VOC level was low immediately after cleaning, there remained volatile compounds in the sludge that gradually were released.

Moreover, cleaning and degassing such storage vessels is further exacerbated by the character of residual sludge in the vessel. Some vessels store water from an oil production well and the sludge therein contains little oil. Some vessels may include "sour" water because the water has absorbed hydrogen sulfide, mercaptans, or other sulfur containing compounds. Other vessels may retain a sludge containing a relatively large amount of "free oil" in the sludge. Some vessels may retain a thick layer of sludge that has little free oil and water and a relatively large amount of oil bound to solid sludge particles. An appropriate treatment regime is required for each of these different residual sludges.

This background discussion is not intended to be an admission of prior art.

SUMMARY

Our method has one or more of the features depicted in the embodiments discussed in the section entitled "DETAILED DESCRIPTION OF SOME ILLUSTRATIVE EMBODIMENTS." The claims that follow define our method of cleaning an oil storage vessel containing sludge, distinguishing it from the prior art; however, without limiting the scope of our method as expressed by these claims, in general terms, some, but not necessarily all, of its features are:

One, according to our method a sealed storage vessel containing volatile organic vapor over a bottom sludge layer is cleaned using either a two-stage or one-stage treatment regime depending on the level of free oil in the vessel. If the free oil is greater than 2 volume percent, the two-stage regime is used where an oil release agent is initially mixed with the sludge to separate the oil from solids in the sludge. The separated oil floats on the surface of water and is removed without substantially exposing the vessel's interior to the atmosphere, leaving within the vessel a mixture of water, solids, and trace amounts of hydrocarbons. Next, a predetermined amount of an emulsifying agent is added to substantially emulsify the trace hydrocarbons, so the level of volatile organic compounds remaining in the interior of the vessel is no greater than 5,000 ppmv, measured as methane, at least one hour after adding the emulsifying agent. If the free oil is less than 2 volume percent, the one-stage treatment regime is employed by only adding the emulsifying agent to achieve this same level of volatile organic compounds. The pH of the water may be adjusted to above 7 prior to removing the degasified sludge from the vessel.

Two, in our method, the level of free oil in the sludge is first determined. When the free oil in the sludge is determined to be less than 2 volume percent of the sludge and without substantially exposing the interior of the vessel to the atmosphere, a sufficient amount of an aqueous surfactant is added to the interior of the vessel to form a stable oil-in-water emulsion that lowers the level of volatile organic compounds in the interior of the vessel to no greater than 5,000 ppmv, measured as methane after at least one hour after adding the aqueous surfactant. One or more hours after adding the aqueous surfactant, the level of volatile organic compounds in the sealed vessel is measured. Only when the level of volatile organic compounds remaining in the vessel is no greater than 5,000 ppmv, measured as methane, is the interior of the vessel exposed to the atmosphere. The emulsifying agent may include microorganisms that digest the hydrocarbons or may include a material that absorbs hydrocarbons or both.

Three, in one embodiment of our method of cleaning and degassing a sludge containing storage vessel, the following steps may be conducted in sequence:

(1) mixing an oil release agent and the sludge to separate the oil in the sludge from solids in the sludge, the separated oil floating on the surface of water in the vessel, (2) after a predetermined time period, removing from the vessel the oil floating on the surface of the water to leave within the vessel a mixture of water, solids, and trace amounts of hydrocarbons, (3) mixing a predetermined amount of an emulsifying agent and the mixture of water, solids, and trace amounts of hydrocarbons to substantially emulsify the trace hydrocarbons, so the level of volatile organic compounds remaining in the interior of the vessel is no greater than 5,000 ppmv, measured as methane, at least one hour after adding the emulsifying agent, and (4) removing from the vessel the mixture including the emulsified trace hydrocarbons and degassing the vessel.

The vessel is substantially sealed from the atmosphere during steps (1) through (3) and is unsealed when the level of volatile organic compounds remaining in the vessel is no greater than 5,000 ppmv, measured as methane, for a period of at least one hour after step (3).

Three, in another embodiment of our method of cleaning and degassing a sludge containing storage vessel, the following steps may be conducted in sequence:

(1) separating from the sludge a portion of oil in the sludge by adding to the storage vessel without substantially exposing the interior of the vessel to the atmosphere a first aqueous surfactant that forms an unstable water-in-oil emulsion, causing the oil to coalesce and form a floating layer of oil on the surface of water collected along the vessel's bottom, (2) without substantially exposing the interior of the vessel to the atmosphere, removing from the vessel the oil floating on the surface of the water to leave along the vessel's bottom a combination of water with trace amounts of hydrocarbons dispersed therein and solids with trace amounts of hydrocarbons adhering thereto, (3) after removing the oil floating on the surface of the water and without substantially exposing the interior of the vessel to the atmosphere, adding a sufficient amount of a second aqueous surfactant to the vessel to form a stable oil-in-water emulsion to lower the level of volatile organic compounds in the sealed vessel to a predetermined level, and (4) substantially removing from the vessel the stable oil-in-water emulsion and residual sludge particles and degassing the vessel.

The level of volatile organic compounds in the sealed vessel is measured and the sealed vessel is unsealed and exposed to the atmosphere when the predetermined level of volatile organic compounds remaining in the vessel is no greater than 5,000 ppmv, measured as methane, for a period of at least one hour after step (3). The first and second surfactants each include a minor portion active ingredients and a major portion water. The amount of water added being based on the active ingredients, with such active ingredients being at least 0.15 weight % active ingredients of the total weight of the sludge.

Four, one or both surfactants may include sorbitan monolaurate, polyoxyethylene sorbitan monolaurate, and triethanolamine, for example:

The first surfactant in undiluted form may comprises
sorbitan monolaurate substantially from 5 to 15 weight percent, polyoxyethylene sorbitan monolaurate substantially from 0.1 to 5 weight percent, triethanolamine substantially from 0.5 to 2.0 weight percent, and the balance water.

The second surfactant in undiluted form may comprises
sorbitan monolaurate substantially from 1 to 3 weight percent, polyoxyethylene sorbitan monolaurate substantially from 5 to 8 weight percent, triethanolamine substantially from 0.5 to 2.0 weight percent, and the balance water.

Either or both the first and second, undiluted surfactants may be diluted with water, and the first and second surfactants may each include a minor portion of active ingredients and a major portion water, where the amount of water added is based on the active ingredients. The active ingredients may be substantially from 0.15 to 0.50 weight % active ingredients of the total weight of the sludge.

These features are not listed in any rank order nor is this list intended to be exhaustive.

DESCRIPTION OF THE DRAWING

Some embodiments of our method are discussed in detail in connection with the accompanying drawing, which is for illustrative purposes only. This drawing includes the following figures (Figs.), with like numerals indicating like parts.

DETAILED DESCRIPTION OF SOME ILLUSTRATIVE EMBODIMENTS

General

Figure 1:
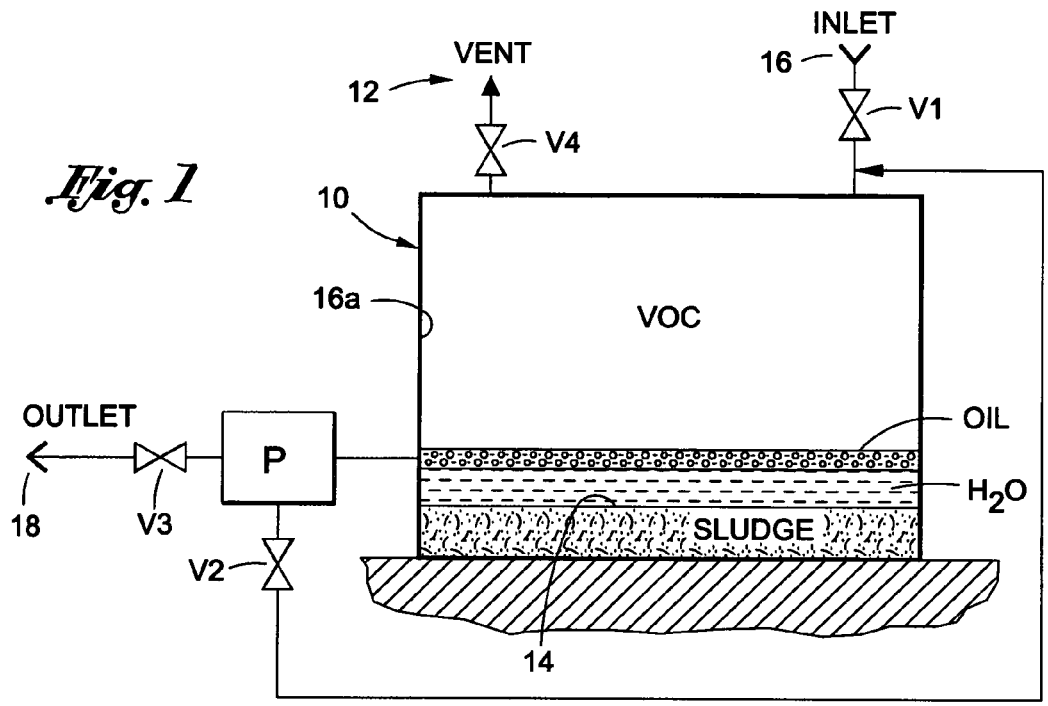
FIG. 1 is a cross-sectional schematic view of an oil storage vessel being cleaned according to the two-stage embodiment of our method where a cleaning agent initially used is designed to facilitate the consolidation and collection of oil on the surface of water in the vessel.

Our method of cleaning a storage vessel containing sludge may require the use of one or two cleaning agents depending on the character of the sludge in the vessel being cleaned.

Two-Stage Embodiment

When the free oil in the sludge is determined to be greater than 2 volume percent of the sludge, two cleaning agents are used. In a first step a cleaning agent is used designed to facilitate the consolidation and collection of oil on the surface of water in the vessel. In other words, it functions as an oil release agent. In a second step a cleaning agent is used designed to facilitate the encapsulation of oil. In this two-stage embodiment of our method, an oil release agent is initially mixed with the sludge to separate the oil in the sludge from solids in the sludge. The oil release agent may be an aqueous surfactant that forms an unstable water-in-oil emulsion, which upon breaking causes the oil to coalesce and form a layer of oil on the surface of water collected in the vessel's bottom. The separated oil floats on the surface of water, and after a predetermined time period, the oil floating on the surface of the water is removed from the vessel to leave within the vessel a mixture of water, solids, and trace amounts of hydrocarbons. This predetermined time is a waiting period sufficient to maximize the amount of oil being separated from the other constituents of the sludge, for example, the time may be greater than about 1 hour after adding the oil release agent. The other sludge constituents comprise mainly a mixture of water, solids, and trace amounts of hydrocarbons. The floating oil is removed without substantially exposing the interior of the vessel to the atmosphere. This avoids premature release of volatile organic vapor.

The initial step is to separate a significant portion of the oil from other constituents of the sludge using a predetermined amount of a first aqueous surfactant as the oil release agent. Upon spraying or otherwise washing the interior surfaces of the vessel with this first surfactant an unstable water-in-oil emulsion is formed. The oil in the sludge is gathered in emulsion micelles, which are microscopic droplets held together by the surface forces of the first surfactant. The micelles have an oil external phase with a small amount of water internal to the oil in the micelles. The water-in-oil emulsion micelles are only marginally stable. This causes the oil to coalesce or coagulate into bigger droplets and the droplets ultimately form a layer of oil on the surface of water collected in the bottom of the vessel, the internal water draining from the unstable emulsion. The oil layer on the surface of the water is then removed from the vessel without exposing the vessel's interior to the atmosphere. The ability of this first surfactant to "wash" the insides of the vessel, however, may increases the level of volatile organic compounds of the gas phase in the vessel above the now water and sludge mixture along the bottom of the vessel. By washing the oil off the vessel's insides into the water, some oil is dispersed in the water rather than collecting on the water's surface. In other words, the first stage treatment alone will not result in most situations in reducing the VOC in the vessel to below the government required level or standard. Thus, in accordance with our method a second stage of treatment is used that in most situations results in reducing the VOC in the vessel to below the government required level or standard. To achieve this a second surfactant is used that is a high-powered emulsifying agent.

After removal of the floating oil, in the second stage a predetermined amount of the high-powered emulsifying agent is mixed with the residual of water, solids, and trace amounts of hydrocarbons to substantially emulsify the hydrocarbons. The emulsifying agent entraps the hydrocarbons and a sufficient amount of the emulsifying agent is used to reduce the level of volatile organic compounds remaining in the interior of the vessel to no greater than 5,000 ppmv, measured as methane, at least one hour after adding the emulsifying agent. The emulsifying agent may be an aqueous surfactant that forms a stable oil-in-water emulsion, and it may include microorganisms that digest the hydrocarbons or a material that absorbs hydrocarbons, for example, activated carbon, or it may include both the microorganisms and absorbent material. In difficult cases an added flocculent or absorbent for the hydrocarbons may be used to further reduce the amount of volatile organic compounds. The vessel remains substantially sealed from the atmosphere during treatment of the sludge and is unsealed when the level of volatile organic compounds remaining in the vessel is measured to be no greater than 5,000 ppmv, measured as methane, for a period of at least one hour after adding the emulsifying agent. The emulsifying agent is relatively fast acting, and after about 180 minutes, the remaining water, solids, and emulsified hydrocarbons are removed from the vessel. In some cases it is preferable to add microorganisms with the emulsifying agents to partially degrade some of the residual hydrocarbon to further reduce their amount. In this case the mixture may be allowed to stand for 10-14 days to allow the microorganisms to remove more of the hydrocarbon from soil in the sludge.

The emulsifying agent may be a second aqueous surfactant that upon injection into the vessel forms a very stable oil-in-water emulsion. This further cleans the vessel and helps "left over" oil in the continuous water phase to coalesce onto residual solid sludge particles. Since the amount of oil in the continuous water phase thus decreases, so does the vapor pressure of the oil compounds over the water phase. Depending on the composition of the oil (the heavier the oil, the lower vapor pressure over the water phase) the vapor pressure becomes acceptable and the vessel may be opened without dumping unacceptable levels of volatile organic compounds into the atmosphere. The concentration of the vapors in the vessel will be reduced well below the lower explosive limits for the hydrocarbon content of the vessels. And in accordance with one feature of our method, the level of volatile organic compounds remaining in the vessel will be no greater than 5,000 ppmv, measured as methane, for a period of at least one hour after completing the second stage.

The first and second surfactants each include a minor portion of active ingredients and a major portion water. The amount added is based on the active ingredients, and is at least 0.15 weight % active ingredients of the total weight of the sludge, and may be substantially from 0.15 to 0.50 weight % active ingredients of the total weight of the sludge.

Biological Reduction of the Residual Hydrocarbons

Optionally, the second aqueous surfactant may include hydrocarbon-degrading microorganisms similar to ones used in oil well treatment, for example, as disclosed by Richard B. Cassinis, William A. Farone, James H. Portwood in "Microbial Water Treatment: An Alternative Treatment to Manage Sulfate Reducing Microbes (SRB) Activity, Corrosion, Oxygen and Oil Carryover at Wilmington Oil Field—Long Beach, Calif.", Presented at the 1998 Society of Petroleum Engineers 1998 Annual Technical Conference and subsequently published in the SPE Proceedings. The microorganisms degrade the collected hydrocarbon on the surface of the solid sludge particles dispersed in the continuous water phase. The microorganisms are added with required nutrients and may be in two forms. Where there is time to allow acclimatization of the microorganisms, they are added as a stabilized powder. It takes about 4-5 days for them to grow and begin substantial degradation. Alternatively, they may be added as a liquid culture from an active degrading bioreactor. In either case, the microorganisms help reduce the concentration of hydrocarbons by oxidative bioremediation. It is desirable to aerate the water in both stages of our method when using microorganisms in the second stage. Hydrocarbons are converted to alcohols and organic acids that may be subsequently biologically used. During the short period in the vessel, typically from about 10 to 14 days, conversion to alcohols and acids is the predominant mechanism. These compounds are water-soluble, and consequently are dissolved in the continuous water phase to reduce the volatile organic compounds in the vessel and lower the vapor pressure of the hydrocarbon components.

Examples of Aqueous Surfactants

Solution A (Table I) is an example of the first aqueous surfactant. Solution A causes the oil to separate from the sludge and water and rise to the water's surface. After removing from the vessel the oil on the water's surface, the residual sludge is then treated with Solution B (Table II). This Solution B may be used alone or with the addition of hydrocarbon degrading microorganisms. In either case the solution causes any remaining oil in the water or residual sludge to be emulsified. Emulsified oil has a lower vapor pressure than unemulsified oil so that the vapor pressure in the vessel decreases. Emulsified oil is also more easily attacked by the hydrocarbon degrading microorganisms, which further reduces the vapor pressure as some of the oil's hydrocarbons are converted to more soluble alcohols, aldehydes and acids by the microorganisms. Both Solutions A and B have a pH higher than 7 to reduce odors of mercaptans and other sulfur compounds as well as help solubilize organic acids. Both Solutions A and B are biodegradable and compatible with the oil degrading microorganisms if included in Solution B. Other ingredients can be added to both solutions. For example, in Solution B one can add microorganisms or oxygen releasing chemical to assist in the microbial degradation of the hydrocarbons. The triethanolamine can be replaced by other amines such as aminoethanol.

TABLE I

Composition of Solution A

| Chemical | Weight Percent | CAS Number |
|---|---|---|
| Sorbitan Monolaurate | 5-15 | 1338-39-2 |
| Polyoxyethylene Sorbitan Monolaurate | 0.1-5 | 9005-64-5 |
| Triethanolamine | 0.5-2.0 | 102-71-6 |
| Other Surfactants | 1.0-3.0 | |
| Water | 77-94 | 7732-18-5 |

TABLE II

Composition of Solution B

| Chemical | Weight Percent | CAS Number |
|---|---|---|
| Sorbitan Monolaurate | 1-3 | 1338-39-2 |
| Polyoxyethylene Sorbitan Monolaurate | 5-8 | 9005-64-5 |
| Triethanolamine | 0.5-2.0 | 102-71-6 |
| Other Surfactants | 1.0-3.0 | |
| Water | 82-94 | 7732-18-5 |

The other surfactants are optional and may include other chain length sorbitan and glycerol esters either with or without ethoxylation.

Example 1

A typical Solution A formulation that is useful for most vessels is:

| | |
|---|---|
| 8% | sorbitan monolaurate, |
| 2% | polyoxyethylene sorbitan monolaurate, |
| 1% | triethanolamine, and |
| 89% | water. |

The Solution A of this Example 1 is diluted to approximately 9:1 just before introducing into the vessel.

Example 2

A typical Solution B formulation that is useful for most residual sludge is:

| | |
|---|---|
| 1.75% | sorbitan monolaurate, |
| 6.75% | polyoxyethylene sorbitan monolaurate, |
| 0.5% | triethanolamine, |
| 1% | sodium lauryl sulfate, and |
| 90% | water. |

The Solution B is diluted to approximately 1.5-2.0 weight % as B or approximately 0.15-0.2 weight % as pure active ingredients.

A typical rate of addition of active microorganisms is to achieve a culture count of at least 106 CFU (Colony Forming Units via Plate Count) with 108 CFU or greater at the end of the treatment. Nutrients for the rapid growth of microorganisms containing a carbon source and nitrogen, phosphorous and potassium can also be added to Solution B.

One Stage Embodiment

In another embodiment of our method, when the free oil in the sludge is determined to be less than 2 volume percent of the sludge, only one agent are used, namely, the aqueous surfactant that forms a stable oil-in-water emulsion. With such low amounts of free oil being present in the vessel being cleaned, only a single or one stage is needed and the agent is added prior to any effort to separate oil from the sludge. The agent may be a surfactant forming a stable oil-in-water emulsion that entraps oil. The inclusion of microorganisms and/or absorbent material in this surfactant further insures that the level of volatile organic compounds remaining in the vessel will be no greater than 5,000 ppmv, measured as methane, for a period of at least one hour after adding this surfactant forming a stable oil-in-water emulsion. When water is "sour," its pH is adjusted to above 7 prior to removing the stable oil-in-water emulsion entrapping the oil. Typical pH ranges substantially from 4 to 8. This residual water including the emulsified hydrocarbons and any dissolved or dispersed reaction products or solid particle are drained away without exposing the interior of the vessel to the atmosphere and then the vessel is degassed.

Determination of Amount of Free Oil in Vessel Being Cleaned

The amount of free oil in the vessel being cleaned is determined by withdrawing a sample of sludge from the vessel and then following this procedure:

The sample is thoroughly mixed and three portions are treated as follows. A control portion of the sample is placed in a closed vial of about 50 milliliter volume. Another portion of the sample is mixed with solution A at 9 parts of the sample to 1 part of solution A and placed in another 50 milliliter vial. A third portion is mixed with a solution of 3 parts of water and 1 part of solution A. One part of the 3:1 water: solution A mixture is mixed with 1 part of the sludge sample and also placed in a third 50 milliliter closed vial. All three vials are agitating by shaking and allowed to stand. If an oil layer forms on top of a water layer in any of the three vials, the sludge is considered to have enough free oil to warrant treatment with the two stage embodiment of our method. The two test solutions in the vials represent the range of conditions that will cause oil-water separation. In general, the free oil content is greater than about 2 volume percent if an oil layer forms.

Calculation of Amount of Agents

In both the two-stage and one-stage embodiments of our method, the amount of agents used is calculated to optimize reduction of the volatile organic compounds. The following are examples of the calculation steps for vessels of two common geometrical configurations:

A substantially vertically oriented cylindrical vessel:
The height of the sludge layer is determined in including any water layer above the oil. This can be measured with a rod, a sight glass or by recorded measurements of tank usage. The volume can then be calculated from the standard formula for the Volume of a cylinder (Volume=$\pi r^2 h$ where r is the radius of the tank and h is the height of the sludge). The volume is converted into a weight using either a measured density or an estimate (e.g. 8 pounds per gallon for a water and oil—sludge mixture). Where available the measured density should be used. The agent used must be sufficient such that the active ingredients represent at least 0.15% of the total weight after the agents and any water have been added.

A substantially horizontally oriented pipeline:
The total length of pipe and its diameter must be known. This is the maximum possible volume to be treated. The level of sludge in the pipe is then determined by inspection. The level of the sludge is treated as a fraction of the diameter of the pipe and the formula for the segment of a circle is used to find the fraction of the cross sectional area filled with sludge compared to the cross sectional area of the pipe. This fraction is then multiplied by the maximum possible volume to find the volume of the sludge. The volume is converted into a weight using either a measured density or an estimate (e.g. 8 pounds per gallon for a water and oil—sludge mixture). Where available the measured density should be used. The agent used must be sufficient such that the active ingredients represent at least 0.15% of the total weight after the agents and any water have been added.

If h is the height of the sludge at the deepest point in the cross section of the pipe and r is the radius of the pipe then the Area of the sludge layer is:

$$A=h(3h^2+4s^2)/6s$$

Where $$s^2=8h(r-h/2)$$

FIG. 1

As illustrated in FIG. 1 a vessel to be cleaned, for example, an above ground oil storage tank 10 drained of substantially all its stored oil, is cleaned and degassed according to our method. (The tank 10 may have a fixed roof or a floating roof and may be underground.) The tank's vent 12 has a valve V1 closed so that any volatile organic compounds (VOC) in the gas phase above a sludge layer 14 do not escape to the atmosphere. This valve V1 is only opened to unsealed the tank 10 when the level of VOC remaining in the vessel is no greater than 5,000 ppmv, measured as methane, for a period of at least one hour after cleaning the tank. After withdrawing a sample of the sludge from the layer 14 and determining that its free oil content is greater than about 2 volume percent, the diluted first surfactant, 9:1 diluted Solution A, is introduced into the tank by opening the valve V2 and feeding diluted Solution A through an inlet 16 into the top of the tank 10, usually spraying it along the surface of the interior sides 16a of the tank so that it runs over these surfaces, washing them of oil and collecting an unstable water-in-oil emulsion in the bottom of the tank 10. The valve V2 is closed after introducing into the tank 10 diluted Solution A. A pump P may be used to circulate a mixture of the water-in-oil emulsion and sludge by closing a valve V3 to an outlet 18 and opening a valve V2 in a line connected downstream of the valve V1. After circulation, the mixture is allowed to settle for about 1 hour after discontinuing the operation of the pump P to enable the coalesced oil to collect on the surface of water in the bottom of the tank 10. Then the valve V2 is closed and the valve V3 is opened and the oil floating on the water's surface is pumped out the outlet 18, leaving in the bottom of the tank 10 mixture of water, solids, and trace amounts of hydrocarbons. The valve V3 is closed immediately after removal of the oil to avoid exposing the interior of the tank 10 to the atmosphere and allowing any VOC to escape.

FIG. 2

Figure 2:
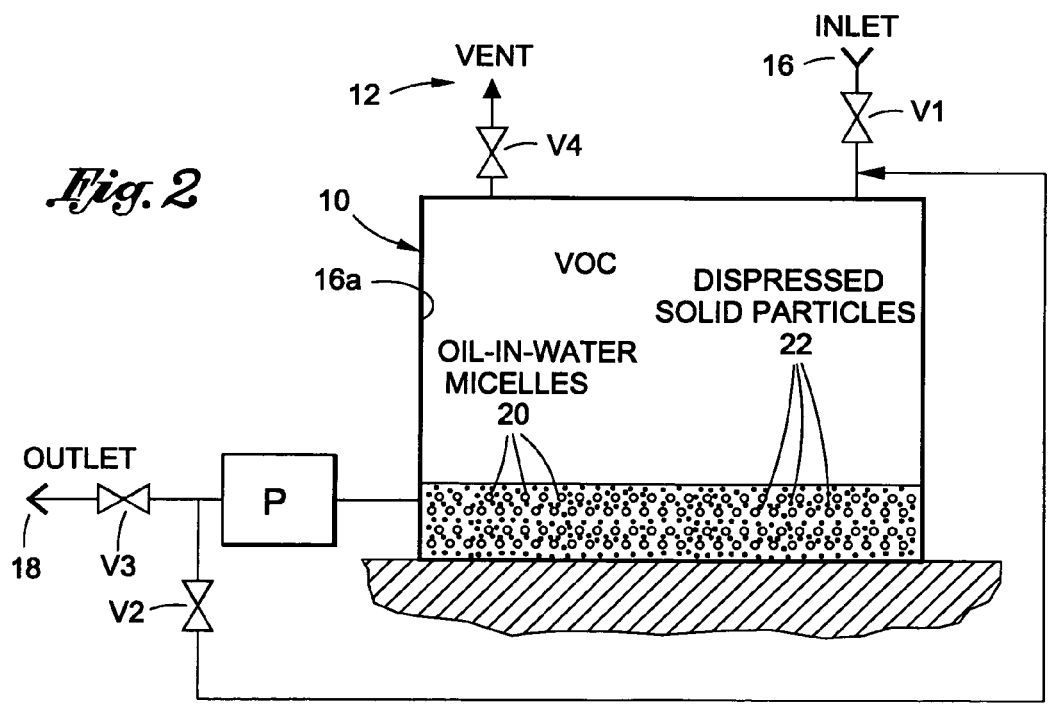
FIG. 2 is a cross-sectional schematic view of an oil storage vessel of FIG. 1 being cleaned according to the second stage of the two-stage embodiment of our method. This FIG. 2 also depicts the one-stage embodiment of our method where a cleaning agent initially used is designed to facilitate emulsifying and entrapping hydrocarbons dispersed in the water in the vessel.

The second stage of our method is conducted by again opening the valve V1 and then introducing the high-powered emulsifying agent, the diluted solution B, through the inlet 16 into the tank 10. As depicted in FIG. 2, with the valves V1 and V2 closed and the valve V2 open, the pump P circulates the contents of the tank 10 to form micelles 20 of an oil-in-water emulsion dispersed in a liquid phase in the tank's bottom. These micelles 20 retain the hydrocarbons within the mixture, consequently avoiding or minimizing the formation of VOC on the gas phase above the liquid phase. The solid sludge particles 22 are also dispersed in this liquid phase. The VOC content in the gas phase is measured either before or after removal of the liquid phase from the tank 10. This is accomplished by closing the valve V2 and opening the valve V3 and operating the pump P. Provided the gas phase after 1 hour has no greater than 5,000 ppmv, measured as methane, of VOC, the valve V4 is opened to expose the interior of the tank 10 to the atmosphere, degassing the tank.

If it is determined that the free oil content is less than 2 volume percent, then only the solution B is used as discussed above in connection with FIG. 2.

In both the two-stage and one-stage treatment regimes, the materials being used depends on their composition, the amount of time for the remediation, and the composition of the sludge constituents. The exact amount of each solution needed depends on the composition of the oil in the tank and the amount of water and soil. Generally the amount of active ingredients will need to be at least 0.15% of the total weight of the sludge. For oils that are more saturated, more waxy and of higher viscosity that amount can increase to 0.3% and in extreme case (almost like asphalt) the amount can be 0.5%.

SCOPE OF THE INVENTION

The above presents a description of the best mode we contemplate of carrying out our method and of the manner and process of using it, in such full, clear, concise, and exact terms as to enable any person skilled in the art to which it pertains to make and use our method. Our method is, however, susceptible to modifications and alternate constructions from the illustrative embodiments discussed above which are fully equivalent. Consequently, it is not the intention to limit our method to the particular embodiments disclosed. On the contrary, our intention is to cover all modifications and alternate constructions coming within the spirit and scope of our method as generally expressed by the following claims, which particularly point out and distinctly claim the subject matter of our invention:

The invention claimed is:

1. A method of cleaning and degassing a storage vessel containing sludge comprising the steps of
   (a) mixing an oil release agent and the sludge to separate oil in the sludge from solids in the sludge, said separated oil floating on the surface of water in the vessel,
   (b) after a predetermined time period, removing from the vessel the oil floating on the surface of the water to leave within the vessel a mixture of water, solids, and hydrocarbons,
   (c) mixing a predetermined amount of an emulsifying agent and the mixture of water, solids, and hydrocarbons to substantially emulsify the hydrocarbons, so the level of volatile organic compounds remaining in the interior of the vessel is no greater than 5,000 ppmv, measured as methane, at least one hour after adding the emulsifying agent, and
   (d) measuring the level of volatile organic compounds in the vessel one or more hours after adding the emulsifying agent and opening the vessel to the atmosphere only when the level of volatile organic compounds remaining in the vessel is no greater than 5,000 ppmv, measured as methane,
   (e) removing from the vessel the mixture including the emulsified hydrocarbons.

2. The method of claim 1 where the predetermined time period is greater than 1 hour.

3. The method of claim 1 where the emulsifying agent includes microorganisms that digest the hydrocarbons.

4. The method of claim 3 where the emulsifying agent includes a material that absorbs hydrocarbons.

5. The method of claim 1 where the vessel is substantially sealed from the atmosphere during steps (a) through (c) and is unsealed when the level of volatile organic compounds remaining in the vessel is no greater than 5,000 ppmv, measured as methane, for a period of at least one hour after step (c).

6. A method of cleaning and degassing a storage vessel that is sealed from the atmosphere and contains within its interior volatile organic vapor above a layer of sludge along the vessel's bottom,
   said method comprising the steps of
   (a) separating from the sludge a portion of oil in the sludge by adding to the storage vessel without substantially exposing an interior of the vessel to the atmosphere a first aqueous surfactant that forms an unstable water-in-oil emulsion, causing the oil to coalesce and form a floating layer of oil on the surface of water collected along the vessel's bottom,
   (b) without substantially exposing the interior of the vessel to the atmosphere, removing without substantially exposing the interior of the vessel to the atmosphere, removing from the vessel the oil floating on the surface of the water to leave along the vessel's bottom a combination of water with hydrocarbons dispersed therein and solids with hydrocarbons adhering thereto,
   (c) after removing the oil floating on the surface of the water and without substantially exposing the interior of the vessel to the atmosphere, adding a sufficient amount of a second aqueous surfactant to the vessel to form a stable oil-in-water emulsion to lower the level of volatile organic compounds in the sealed vessel to a predetermined level,
   (d) measuring the level of volatile organic compounds in the sealed vessel and unsealing the sealed vessel and opening the vessel to the atmosphere when the predetermined level of volatile organic compounds remaining in the vessel is no greater than 5,000 ppmv, measured as methane, for a period of at least one hour after step (c), and
   (e) substantially removing from the vessel the stable oil-in-water emulsion and residual sludge particles.

* * * * *